Patented Feb. 24, 1931

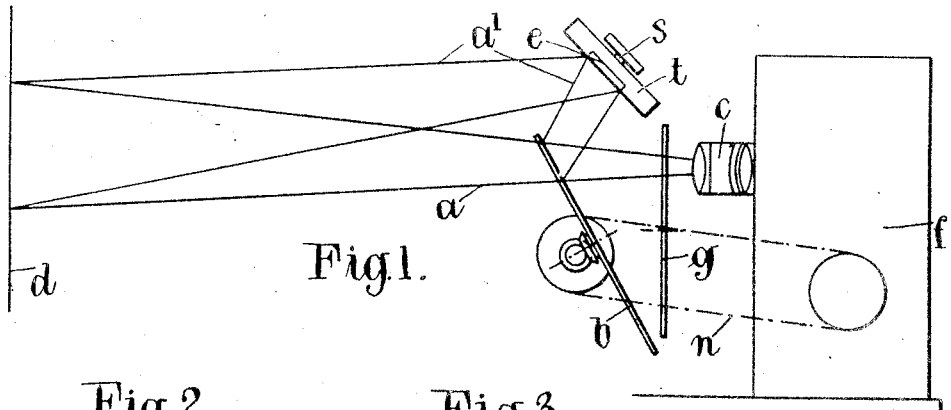
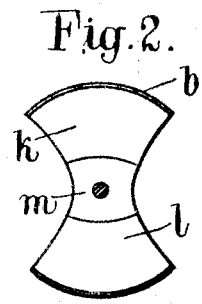
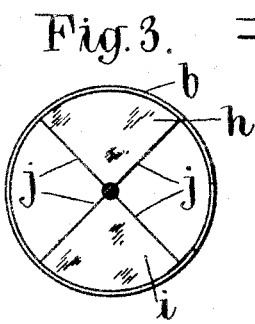
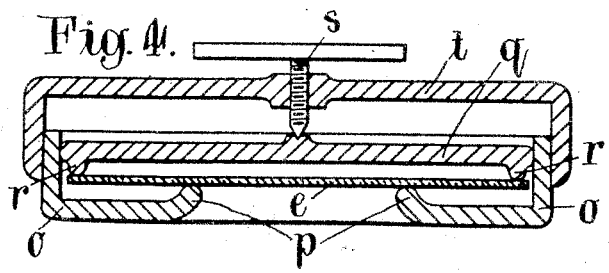
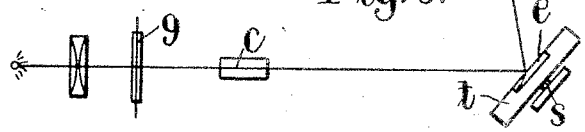
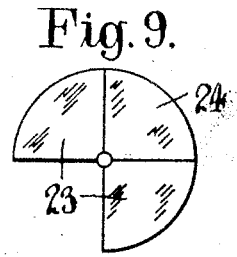
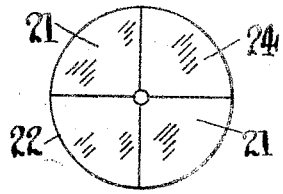

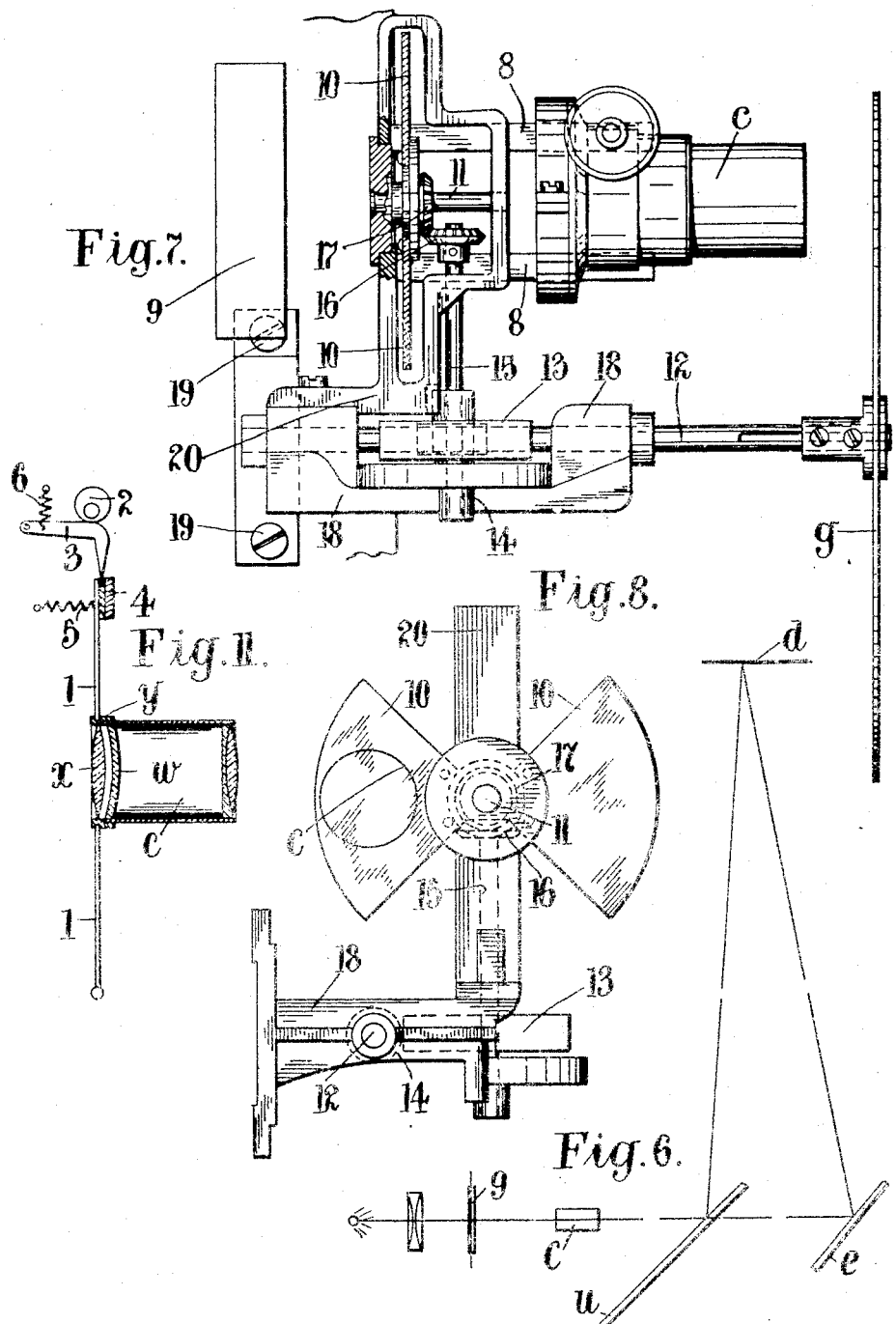

1,794,103

UNITED STATES PATENT OFFICE

ARCHIBALD STANNARD CUBITT, OF LONDON, ENGLAND

PROJECTION OF PICTURES, PARTICULARLY CINEMATOGRAPH PICTURES WITH QUASI OR PSYCHIC STEREOSCOPIC IMPRESSION

Application filed April 3, 1925, Serial No. 20,539, and in Great Britain April 8, 1924.

The aim of the present invention is to impart an element of stereoscopic illusion to pictures particularly pictures projected from an ordinary positive image on a lantern slide or on a cinematograph film as made from an ordinary negative film and used in a cinematograph show house, or from the ordinary image on the film or film system as used in methods or colour cinematography.

To realize the aim of the present invention the beam of rays, hereinafter termed the "image-forming-beam", is so modified or treated, either before or after the beam has been brought under the co-ordinating influence of the lens, that quasi-stereoscopic effects are produced on the screen by projecting alternating sharp definition and blurred or less sharp definition images from an ordinary positive made from an ordinary negative.

Thus it is to be understood that the present invention does not produce a union in the sensorium of two separate or distinct geometrical perspectives, as results by reason of each eye seeing that aspect of drawing appropriate to itself and that only; a status which the applicant believes can only be fully realized upon the screen by projecting the two pictures, as seen by the two eyes, and then giving to each spectator a discriminative ocular by which each eye sees its own perspective aspects and no other: the confusion otherwise ruling, then becoming order.

In aiming to impart stereoscopic illusion to the exhibition of ordinary films, whether for monochrome or colour, the present invention tends to or does periodically break down or weaken that inhibition of visual accommodation which comes from intently watching one fine definition in visual plane, as a screen. Thus spectators are prepared for a realization of any true stereoscopic effect inherent in the pictures or for such suggested pseudo, psychic, or other stereoscopic effect as is incidental to the present invention.

This the present invention does by introducing periods of blurring so as to bring into effect some of that stereoscopic illusion which is latent in most ordinary photographs, but in doing this the present invention does not operate upon or alter the standard or usual photographic films themselves, the changes on the image forming beam being during exhibition.

The present invention broadly consists of the production of quasi-stereoscopic effects on the screen by projecting alternating sharp definition and less sharp definition images from an ordinary positive made from an ordinary negative, all the negative images being taken in the same plane of the subject in focus.

The drawings illustrate several examples of carrying the invention into effect although it is to be understood the invention is not limited to these ways as other technical equivalents may be used.

Fig. 1 is a diagrammatic view of one way, Figs. 2 and 3 show detail views of two forms of rotating mirrors, and Fig. 4 a sectional elevation of a stationary reflector and its casing, for use with Fig. 1.

Figs. 5 and 6 are diagrammatic views of other ways of carrying out the invention.

Figs. 7 and 8 are respectively side and end views of a method in which a disturbing member is periodically introduced in the path of the beam.

Figs. 9 and 10 are further examples of disturbing members.

Fig. 11 shows diagrammatically an arrangement for periodically shifting certain constituents of the lens so as to disturb the correction for spherical aberration.

Referring to Figs. 1 to 4 in this aspect of the present invention the image forming beam $a$ is cut obliquely and periodically by a revolving sectorial shutter or mirror $b$. $c$ is the lens and $d$ the screen.

A sector of this shutter $b$ when it cuts the beam, reflects the rays to a second mirror $e$ which is adjustable, and stationary, and which reflects the beam $a$ to the screen $d$ by a longer path $a'$, the adjustment of the second mirror $e$ being such that the two images so fall on the screen alternately that if simultaneous they would be superimposed, but in "superimposing", aim is preferably directed towards producing a lateral fringe on the combined aspect.

Thus we have two optical paths from lens $c$ to screen $d$: one $a$ direct, the other $a'$ as lengthened by two reflections and thus giving out of focus effect on the screen.

$f$ represents the cinematograph apparatus, and $g$ the ordinary shutter.

Two forms of the revolving mirror $b$ are shown by Figs. 2 and 3. The disc form as shown by Fig. 3, takes the form of a transparent disc, as of optically surfaced glass, having a portion, or two sector-like portions $h$ and $i$ made reflecting or silvered; and the edges $j$ of the silvering may be vignetted or hatched to obviate too abrupt transition between transmission and reflection. The revolving mirror shown by Fig. 2 consists of two sector-shaped mirrors $k$ and $l$ mounted in or on a suitable frame $m$.

The sectorial shutter $b$ being revolved we have alternations of usual sharpness and intentional blurring, leading to a new degree or element of stereoscopic illusion without the inconvenience of usual special discriminating spectacles. For example, each period of blurring tends to release or to relieve the sensorium from its mesmeric strain and fixed aspect of non-accommodation. Three strains of visual action may contribute to the desired result, videlicet:—

1. Partial release of the strained grip of the sharp image followed by a psychic drift to some other aspect.

2. More ease, hence more realization of any inherent stereoscopicity in the picture.

Films are often taken with an $\frac{f}{2}$ lens of 3 inches focus which on the 1½ inch horizontal aspect would indicate about half the angular difference involved in the strict geometrical aspect.

3. Suggestiveness of the marginal halo of unsharpness, or of the retinal reversal of such halo when the changes are operated slowly. These halos may be, and perhaps often are extremely suggestive of solidity and the mentality frequently fills in details; much in the same way that a vague streak of light will often suggest a well defined "ghost".

The shutter $b$ may be driven in any suitable way, for example, by a positive gear drive from the cinematograph apparatus, or by a drive which is fluent or independent, as for example by a hand gear or a pulley drive $n$ from the cinematograph machine. The freedom of choice in matters of this kind gives the present invention a substantial advantage over methods in which special films are used with conditions of blurring irrevocably impressed thereon.

The mirror $e$ which receives the reflected image-forming-beam from the revolving sectorial shutter $b$ instead of being always flat may be made concave by pressure so as to partially compensate for enlargement of image which like blurring, results from the longer path, but as compensation for size would run more or less in like steps with improved definition, special means may be used to adjust matters, as graduated zonal or other pressures on the adjustable stationary mirror so as to concave it or deform it appropriately: the mirror being a thin flat of silvered glass or like, or technical equivalent, as thin elastic metal. An ellipsoid, toric, or cylindric element of deformation may be introduced for producing a lateral fringing as hereinabove mentioned.

In order to give the mirror $e$ the desired curvature to correct or vary the dimensions of the picture, I may adopt the construction shown in Fig. 4 in which $e$ represents a sheet of glass having a mirrored surface. This is mounted in a saucer shaped member $o$ having a central aperture with inturned edges $p$ upon which the glass rests. Behind the sheet of glass is provided a metallic plate $q$ having beaded edges $r$ which engage the glass near its periphery on the opposite side to the edges $p$. Bearing on this plate $q$ is an adjustable screw $s$ carried by a bracket member $t$. By adjusting the screw $s$ pressure is applied on the edges of the glass disc $e$ and this causes the glass to bend so that the portion visible through the central aperture in the member $o$ is curved. The arrangement illustrated will give a concave mirror and if a convex mirror is desired, the supports will have to be reversed.

In operation if mirror $e$ were flat the picture reflected from it would be larger than that thrown directly on the screen owing to the longer path of the reflected rays. Above a certain distance from the film this difference in size would be too much to give the desired effect. By bending the mirror however so that it has a concave reflecting surface the difference in dimensions of the two pictures can be adjusted the desired amount.

According to another aspect of the present invention as shown diagrammatically in Fig. 5 a thin or flexible mirror $e$ like that shown in its casing by Fig. 4 is set or adjusted in the path of the direct beam from the projector, in such manner as to reflect the rays on to the screen.

The variation from sharp to blurred may now be made by compressing at the right periods as for example, by the screw $s$, or by a cam or other technically equivalent method which gives the necessary periodic or pulsating pressure on the plate $q$. This method should realize the theoretical aim of no overlap of the sharp image with the blurred image. Any convenient means may be employed for imparting the correctly timed impulses on the mirror.

Instead of periodically straining the mirror $e$ of Fig. 5 into curvature, this mirror may remain flat or under one chosen adjustment and stationary, an oblique rotating mirror $u$, Fig. 6, now crossing the beam between the projecting lens $c$ and the mirror $e$, so as to reflect periodically some of the rays on the screen $d$, while the remainder pass the rotating mirror so as to be reflected from the stationary mirror $e$.

Periodical and controlled blurring of image may be realized with a minimum alteration of other conditions by so shifting the constituents of the lens as to disturb the correction for spherical aberration; this being especially the case with the Petzval portrait lens, a usual lens for cinema work and the Dallmeyer modification.

One way of doing this is shown diagrammatically in Fig. 11 in which the distance is varied between the back flint $w$ and the back crown $x$ of the aforementioned forms of lens. This procedure has the advantage of introducing no new optical parts or reflecting surfaces. The back crown $x$ is in an independent mount $y$ carried by a pivoted member 1, movement of the crown $x$ from the back flint $w$ being effected, through the pivoted member 1, by a cam and pawl device 2, 3. 4 is a stop and 5 and 6 are yielding means, 5 urging the mount $y$ to a normal position, and 6 acting to impart a quick return to the pawl 3. Another way of doing this would be by carrying the back crown in a mount which is given a slight axial movement by an edge cam device.

By cylindricity such as is herein suggested the unsharp alternations can be so produced as to form that which is hereinabove called "a lateral fringe", but a similar status may be effected conveniently by a lateral movement of the objective parallel to its axis for example at the same time as the spherical aberrations are interfered with by movement of the back crown $x$.

Thus if the elements $x$ and $w$ of the back combination of the Petzval lens or Dallmeyer-Petzval are so readjusted as to introduce blurring and at the same time the whole lens $c$ is moved to one side and a little downwards, there may be realized a kind of shading similar to or comparable with that by which sign painters sometimes give a stereoscopic illusion to painted letters. The optical simplicity of this arrangement brings with it many elements conducive to brilliancy and purity of image.

Moreover such treatment of the image-forming-beam at the lens conduces towards mechanical ease in giving that multiple and extended facilities in controlling the periods and degrees of blurring and treatment as is herein indicated as desirable.

Another method is to periodically shift the whole lens in the sense of putting the image out of focus. Otherwise a disturbing member may be periodically introduced before or behind the lens or medially in the usual position of the Waterhouse diaphragm or medially between the lens elements. As disturbing members for such use the following may be mentioned:—

1. Cell-structure, textile or grille of transparent or translucent fibres, as drawn silk, drawn mercerized cotton, acetate celluloid or like.
2. Plane parallel glass or quartz pieces (thickness piece).
3. A thickness piece like (2) but with cylindrical element on one face or in one plane.

Figs. 7 to 10 inclusive are examples of (2), in which sectorial pieces may cut across the beam either at right angles therewith or at an appropriate oblique angle with power of adjustment, such as by angular adjustment of the rotating axis.

Referring to Figs. 7 and 8, $c$ is the lens, 8 the lens support and 9 the gate.

Between the gate 9 and the lens $c$ there is introduced a disturbing member consisting of a sectorial pair of plane parallel glass or quartz pieces 10, 10, mounted on a rotating spindle 11. The spindle 11 is driven from the shutter shaft 12 by a 4 to 1 helical gear, 13 and 14, 14 being mounted on 12 and 13 on a spindle 15, a pair of mitre wheels 16 and 17 connecting 15 and 11.

The shutter shaft 12 is carried by a bracket 18, the shaft 12 being driven in any convenient way from the cinematographic mechanism. The bracket 18 is fixed at 19, 19 to the usual box or support of the projector. On the bracket 18 is an upright frame 20 in which the spindle 11 is mounted.

The ratio of the gearings 13, 14, 16 and 17 may be suitably varied.

The parts 18 and 20 form a carrier which in itself is a fitting attachable to the cinematographic apparatus.

In Fig. 8 the members 10, 10 have been moved through 90° relatively to their position in Fig. 7.

In an experiment with a short picture throw of 18 feet the thickness of glass used as the disturbing member in Figs. 7 and 8 was 1½ mm., but this thickness will of course vary greatly with the optical characteristics of the system of projection. In a test with a Ross lens and a picture throw of 145 feet, the thickness of glass used was 1 mm.

To obviate the necessity of using very thin glass a member as shown in Fig. 10 may be used, in which the sectors 21 and sectors 22 differ in thickness, the thinner sectors 21 giving the sharp images and the thicker sectors 22 the blurred images.

To give a less abrupt transition the member as shown in Fig. 9 may be used in which the sectors 23 are intermediate in thickness between the sector 24 and zero thickness. In this arrangement the images through all the sectors are blurred, but those through the sectors 23 less blurred than that through 24.

In another example a lens may be mounted in the direct path of the rays from the projector and arranged so as to rotate about a diameter. This lens is rotated at the desired speed and is so arranged that when lying parallel to the lens of the projector it slightly alters the focus of the picture but when at right angles to the projector lens it will cast little or no shadow on the screen.

Projection of the blurred images so that they move to one side and a little downwards may be done in relation to Figs. 1, 6 and 7 by slightly tilting the axis of the mirror or disturbing element, or in Figs. 1 or 5 by eccentrically deforming the mirror *e*. Deformations of the adjustable stationary mirror from its original status of optical flatness as also controls of the alterations may be conveniently initiated, timed and controlled as to degree, by pneumatic or hydrodynamic electric flexible cord flexible sliding wire or other technically equivalent actions from a position in the body of the cinema house where an independent observer can judge of the psychical conditions rendering change desirable; a state of things additional to rather than replacing such controls by the projection machines or near the lantern as have been suggested.

The ratios of alternating sharp to blurred images may be widely varied. For example in the construction shown by Figs. 7 and 8 with a projection speed of 16 pictures to a second, eight images may be sharp and eight blurred, the change over from sharp to blurred synchronizing with the pull down of the film. As another example by Fig. 9 one would get one sharp followed by three blurred.

Generally speaking the alternations between sharpness and blurring should be so slow that the changes do not coalesce so completely as to be quite lost within the range of continuity of vision.

A trial run for experimental purposes with apparatus according to Figs. 7 and 8, with one alternation for two pictures gives a remarkably good result with an absence of after eye strain to the average spectator.

As regards the use of the term "alternations" hereinabove, it is to be understood that this term does not mean that the two phases of an "alternation" are necessarily equal in duration or time, although often or even generally equal. For example, a prolonged break in the strained condition of visual non-accommodation may be desirable and this may be realized by a prolonged period of blurring accompanied by weak illumination of appropriately positioned signs indicating "Chaos", "Confusion" or like. After this a more standard or usual aspect of alternations may ensue. For example one double-phase alternation between sharp and blurred to every 2, 3 or 4 pictures.

An appropriate phase of music may assist in a psychic change, as bearing on visual accommodation.

In operating the present invention as herein specified, runs of non-stereoscopic effect may be desirable, not only for wordings or like but also for "rather flat" parts appropriate for contrasting with the parts in which a full stereoscopic illusion is aimed at.

The present invention is applicable to various aspects of colour cinematograph projection. When there is but one image-forming-beam the treatment of the beam may be precisely as herein specified. When there is a duality or multiplicity of image forming beams all the beams should be similarly and synchronously treated to avoid undue colour analysis or separation or fringing.

I am aware that a motion picture projector has been proposed in which pictures of the approved type of film are projected upon the screen in two laterally offset images or pictures, which are merged one into the other by the utilization of lens through which each spectator visions the pictures, thereby providing the depth, as well as the breadth and length to the pictures, and no claim is made to such a projector.

What I claim is:—

1. The method of producing relief effects in optically projected images from a motion picture positive film having ordinary images thereon which consists in projecting on an ordinary screen, alternating images of sharp definition, and images of less sharp definition, by deviation of the projecting beam, the picture area on the screen remaining substantially in the same position for all the images.

2. The method of producing relief effects in optically projected images from a motion picture positive film having ordinary images thereon, which consists in periodically subjecting the projection beam to the action of a disturbing refracting member introduced thereinto, without changing the direction of the throw of the said beam, so as to project on the screen alternating images of sharp definition, and images of less sharp definition.

3. In motion picture apparatus of the class described, the combination, with an ordinary projector of a disturbing refracting member, and means whereby said disturbing refracting member is periodically introduced in the path of the beam so as to project, from a film bearing ordinary images, alternating images of sharp definition, and images of less sharp definition, to produce relief effects, the picture area on the screen remaining substantially in the same position for all the images.

4. Motion picture apparatus, according to claim 3, having means for periodically introducing said disturbing refracting member between the gate and the lens of said optical lantern so as to project alternating images of sharp definition, and images of less sharp definition, to produce relief effects.

5. In motion picture apparatus, of the class described, the combination with an ordinary projector of a disturbing refracting member for changing the condition of the projection beam so as to project from a film bearing ordinary images alternating images of sharp definition, and images of less sharp definition, a fitting attached to said projector, said disturbing refracting member being mounted in said fitting, and means for driving said disturbing refracting member from the ordinary projector driving means.

6. Motion picture apparatus according to claim 3, wherein the disturbing refracting member consists of sectional pieces.

In testimony whereof, I affix my signature.

ARCHIBALD STANNARD CUBITT.